United States Patent
Schmid et al.

(10) Patent No.: US 9,263,955 B2
(45) Date of Patent: Feb. 16, 2016

(54) SWITCHED MODE CONVERTER AND METHODS OF CONTROLLING SWITCHED MODE CONVERTERS

(75) Inventors: Markus Schmid, Jettingen-Scheppach (DE); Johann Baptist Daniel Kuebrich, Schlusselfeld (DE); Thomas Antonius Duerbaum, Baiersdorf (DE); Hans Halberstadt, Groesbeck (NL); Gian Hoogzaad, Mook (NL); Frans Pansier, Nuenen (IL)

(73) Assignee: NXP B.V., Eindhoven (NL)

(*) Notice: Subject to any disclaimer, the term of this patent is extended or adjusted under 35 U.S.C. 154(b) by 200 days.

(21) Appl. No.: 14/342,724

(22) PCT Filed: Sep. 3, 2012

(86) PCT No.: PCT/EP2012/067092
§ 371 (c)(1),
(2), (4) Date: Jun. 10, 2014

(87) PCT Pub. No.: WO2013/034517
PCT Pub. Date: Mar. 14, 2013

(65) Prior Publication Data
US 2015/0117066 A1    Apr. 30, 2015

(30) Foreign Application Priority Data
Sep. 7, 2011    (EP) .................................... 11180398

(51) Int. Cl.
*H02M 3/156* (2006.01)
*H02M 3/335* (2006.01)
(Continued)

(52) U.S. Cl.
CPC ............ *H02M 3/33507* (2013.01); *H02M 1/08* (2013.01); *H02M 3/33523* (2013.01);
(Continued)

(58) Field of Classification Search
CPC ............. H02M 2001/0032; H02M 2001/0035; H02M 3/156; H02M 3/1566; H02M 3/157
USPC ................................... 323/282, 283, 284, 351
See application file for complete search history.

(56) References Cited

U.S. PATENT DOCUMENTS

| 6,194,880 B1* | 2/2001 | Fraidlin | H02M 3/1588 323/222 |
| 6,366,070 B1* | 4/2002 | Cooke | H02M 3/1588 323/222 |

(Continued)

FOREIGN PATENT DOCUMENTS

| CN | 101958650 A | 1/2011 |
| CN | 102111065 A | 6/2011 |
| EP | 2 309 628 A1 | 4/2011 |

OTHER PUBLICATIONS

Kim et al. "Designing Auxiliary Power Supplies for High Efficiency and Low Standby Power", 12 pgs., retrieved from the Internet: Jun. 13, 2012 at http://www.fairchildsemi.com/products/power_supply/auxiliary_power_supplies.pdf (Mar. 5, 2009).

(Continued)

*Primary Examiner* — Gary L Laxton

(57) ABSTRACT

A method is disclosed of controlling a switched mode converter comprising a switch and for providing power to device having a load, comprising: in response to the load exceeding a first threshold, operating in a first mode, being a CCM; in response to the load exceeding a second threshold and not exceeding the first threshold, operating in second mode, being a BCM without valley skipping wherein the switching frequency increases with decreasing load; in response to the load exceeding a third threshold and not exceeding the second threshold, operating in a third mode, being a BCM with valley skipping, wherein the switching frequency depends on the load and the number of valleys skipped and is between a fixed upper and a lower switching frequency limit; and in response to the load not exceeding the third threshold, operating in a fourth mode, being a BCM with valley skipping, wherein the switching frequency depends on at least the load, and is between an upper and a lower switching frequency limit wherein the upper switching frequency limit decreases with decreasing load. A switched mode converter controlled by such a method is also disclosed.

15 Claims, 15 Drawing Sheets

(51) Int. Cl.
*H02M 1/08* (2006.01)
*H02M 1/00* (2007.01)

(52) U.S. Cl.
CPC .......... *H02M2001/0032* (2013.01); *H02M 2001/0035* (2013.01); *H02M 2001/0054* (2013.01); *H02M 2001/0058* (2013.01); *Y02B 70/1491* (2013.01); *Y02B 70/16* (2013.01)

(56) References Cited

U.S. PATENT DOCUMENTS

| | | | | |
|---|---|---|---|---|
| 7,528,554 | B2* | 5/2009 | Chitta | H05B 41/2886 315/291 |
| 7,733,678 | B1* | 6/2010 | Notohamiprodjo | H02M 1/4225 323/222 |
| 8,130,522 | B2* | 3/2012 | Maksimovic | H02M 3/1584 323/222 |
| 8,351,232 | B2 | 1/2013 | Zhang | |
| 8,599,579 | B2* | 12/2013 | Kuebrich | H02M 1/12 363/21.12 |
| 8,604,767 | B2* | 12/2013 | Liu | H02M 3/156 323/284 |
| 8,687,387 | B2 | 4/2014 | Li et al. | |
| 2010/0164455 | A1 | 7/2010 | Li et al. | |

OTHER PUBLICATIONS

Fairchild Semicondutor "FSQ510, FSQ510H and FSQ510M Green Mode Fairchild Power Switch (FPS) for Valley Switching Converter", 13 pgs., retrieved from the Internet: Jun. 13, 2012 at http://www.fairchildsemi.com/ds/FS/FSQ510.pdf (Jan. 31, 2009).

Langeslag, W. et al. "A High-Voltage Compatible BCD SoC-ASIC Performing Valley-Switching Control of AC-DC Power Converters Based on PFC and Flyback Cells", IECON 32nd Annual Conf. on IEEE Industrial Electronics, pp. 2996-3001 (Nov. 2006).

International Search Report and Written Opinion for Int'l. Patent Application No. PCT/EP2012/067092 (Dec. 21, 2012).

* cited by examiner

SWITCHED MODE CONVERTER AND METHODS OF CONTROLLING SWITCHED MODE CONVERTERS

FIELD OF THE INVENTION

This invention relates to switched mode converters and to methods of controlling switched mode converters. In particular it relates to such converters and methods which rely on more than one different control mode, such as continuous conduction mode (CCM), boundary conduction mode (BCM), and discontinuous conduction mode (DCM).

BACKGROUND OF THE INVENTION

Depending on the target application, it is known to control a switched mode converter such as a flyback converter using different control modes, each of which has different advantages and disadvantages:

In continuous conduction mode (CCM), the magnetising current of the magnetic component, such as the transformer of a flyback converter, increases from a non-zero and positive minimum level to a maximum level during a primary stroke, then it decreases back to the minimum level during the secondary stroke. CCM provides the lowest RMS (root mean square) losses both on the primary and secondary sides. However the switching losses are high, particularly the capacitive loss associated with switching on at a voltage of Vin+N*Vout in case of a flyback converter. Also "soft switching" or zero current switching (ZCS) is not available, and there are further losses due to the reverse recovery of the output diode. In low load conditions the efficiency falls off rapidly, since the capacitive switch-on losses remain constant.

In boundary conduction mode (BCM) the magnetising current of the magnetic component such as a transformer increases from effectively zero to a maximum level during a primary stroke, then it decreases back to zero during the secondary stroke. The secondary stroke ends when the current returns to zero, and any subsequent primary stroke immediately follows. Thus current does fall to zero, but there is no gap in the conduction: the conduction mode is thus at the 'boundary' between being continuous and discontinuous. In practice, in BCM, the voltage across the switch usually drops at the end of the secondary stroke, since a ringing or resonance is set up when the current stops; the switching is usually effected at the bottom of the first valley in the voltage across the switch. However, in a variant of BCM known as BCM with valley skipping, the switch-on may be delayed by one or more cycles of this ringing—that is to say, one or more valleys are 'skipped', before the primary stroke is restarted at a further 'valley switching' moment.

BCM mode (with or without valley skipping) has the advantages of low switching losses, (no reverse recovery losses and low capacitive turn-on losses due to valley switching in particular), and a low value of the primary inductance of the magnetic component, enabling a relatively low number of turns, with consequentially reduced series resistance; however the switching frequency varies with input voltage and with load, and due to the principle of BCM operation the switching frequency increases significantly with decreasing loads, giving high switching losses at very high frequencies corresponding to very low loads.

Discontinuous conduction mode (DCM) benefits from lower inductance values. Switching frequency is typically fixed. However, at low load idle time is relatively large resulting in considerably higher peak current and high RMS losses, relative to BCM operation; also, valley switching is not available so that the switching losses are higher than under BCM.

Controllers are known which combine BCM and DCM. Here, at full power true BCM is operated with valley switching; if the load is decreased the switching frequency increases until an upper limit is reached known as a frequency clamp. Thereafter, that is to say at still lower loads, either DCM is applied, or BCM is continued but with valley skipping. This combination of modes suffers from a disadvantage at high load conditions with low input voltage, since then the peak current becomes very high (the switching frequency is reduced, and because, e.g. in the case of a flyback the amount of energy transferred per switching cycle is $\frac{1}{2}LI^2f$ (where L corresponds to the magnetizing inductance, I is the maximum magnetizing current, and f is the switching frequency), the current goes up with lowering frequency). The transformer must be designed for this maximum load at minimum input voltage: the transformer is then suboptimal for intermediate and low loads. In order to accommodate with the inductance value, a high number of turns with at the same time a large air gap has to be used to prevent saturation. Also the RMS current through the switch becomes very large.

Controllers are also known which combined CCM and DCM. The switching frequency is typically fixed. This requires a complex control strategy since CCM has a two pole open loop response, and may have a right half plane zero, while DCM has a simple single pole response.

A datasheet for a power switch, FSQ510, from Fairchild, discloses a control method including a CCM at a high load, and a combination of BCM and BCM with valley switching at intermediate and low loads. However, this solution is not ideal since it requires a very high switching frequency at a relatively low partial load; moreover, it would be nontrivial to fix this disadvantage, since the control strategy uses of the lower frequency limit for the change from CCM to either BCM or DCM, and the lower frequency limit is directly tied to the upper frequency limit, which is itself fixed.

It would be desirable to provide a method of controlling a converter such as a fly-back converter which benefits from at least one of a flexibility of control mode, a relatively simple control strategy, and relatively low losses for a relatively wide voltage and or load range.

SUMMARY OF THE INVENTION

According to a first aspect of the invention there is provided a method of controlling a switched mode converter such as a DC-DC converter having a switch and for providing power to device having a load, comprising: in response to the load exceeding a first threshold, operating in a first mode, being a CCM; in response to the load exceeding a second threshold and not exceeding the first threshold, operating in second mode, being a BCM without valley skipping wherein the switching frequency increases with decreasing load; in response to the load exceeding a third threshold and not exceeding the second threshold, operating in a third mode, being a BCM with valley skipping, wherein the switching frequency depends on the load and the number of valleys skipped and is between a fixed upper and a lower switching frequency limit; and in response to the load not exceeding the third threshold, operating in a fourth mode, being a BCM with valley skipping, wherein the switching frequency depends on at least the load, and is between an upper and a lower switching frequency limit wherein the upper switching frequency limit decreases with decreasing load.

Thus according to this aspect of the invention, an appropriate control mode is operated depending on the power of the load device; in response to changes in the power requirements of the device, the method may select one of several different control modes. It will be appreciated that, in the art of switched mode power converters, the term 'load' is generally used to refer either to the device which draws power from the switched mode power converter, or to the power which the device draws, or attempts to draw, from the switched mode power converter. In order to avoid any possible misunderstanding, it is mentioned that herein, the term 'load' will be used to refer to the power, rather than the device. It will be appreciated that, whilst some limits mentioned herein, such as the fixed upper switching frequency limit in the third mode, may be chosen by the application designer with few constraints, other limits, such as the lower switching frequency limit in the third mode of operation, are predetermined in the sense that they may result directly from either the design topology or the values of the components used in the specific application. The term "limit" is thus to be construed widely, so as to include, without limitation, a limit set by design, topology, application-specific, or by the control algorithm.

Preferably, the switching frequency in the first mode is determined by a timer, the method further comprising the steps of: detecting a valley in the voltage across the switch; and in response to the detection of the valley, disabling the timer.

The timer may determine the switching frequency by causing the switch to switch on after a predetermined time has elapsed for example, a predetermined time since the switch was last switched on. This may produce a fixed switching frequency in the first mode.

Disabling the timer, as summarised above, provides an advantageous way to combine the four modes. With this approach, the switching frequency of the first (CCM) mode can be optimised independently of the other modes. In particular, the switching frequency in the first mode may be made greater or less than a minimum switching frequency in the third mode. In known controllers combining BCM and CCM operation, the switching frequency in the CCM mode must be less than the minimum frequency of a mode using BCM with valley skipping. In other words: the frequency in the BCM mode must be higher than the (fixed) frequency in the CCM mode, in the known controllers. Consequently, it is impossible to exploit reduced frequency operation in BCM mode in these controllers.

Disabling the timer in response to detection of a valley enables lower frequencies than the CCM switching frequency to be used at lower loads. This applies to both the third and fourth modes. In particular, disabling the timer allows the upper frequency limit in the fourth mode to be reduced with reducing load.

Here, disabling the timer means preventing the timer from controlling the switch. This may be achieved in a variety of ways, including but not limited to: resetting the timer, or decoupling an output of the timer from the switch or elements which control the switch.

In the fourth mode, the upper switching frequency limit is preferably reduced dependent upon a control voltage (Vcontrol) of the converter.

In this case, the frequency limit is reduced directly according to the control signal. This provides fast feedback when the load reduces, without needing to wait for the effect of the load reduction to propagate to other variables in the controller. It can also allow flexible control of the reducing frequency limit, because a transfer function from the control signal to the frequency limit can be chosen arbitrarily.

The switching frequency in the fourth mode may be determined by a further timer, which provides a time delay which varies according to the level of the control signal. The further timer is preferably a voltage-controlled timer. It may determine the switching frequency by causing or enabling the switch to switch on when the variable time delay has elapsed for example, after the instant that the switch was last switched on.

In embodiments, the first threshold is the load at which the RMS losses in the switch are equal to the switching losses. Thus, while the first threshold may be widely chosen, system losses may be minimised by choosing the threshold for the transition from a CCM mode to BCM mode, at or close to the load at which the RMS losses in the switch are equal to the switching losses.

In embodiments, the second threshold is the load at which the switching frequency is equal to a predetermined maximum upper switching frequency.

In embodiments, the method further comprises, in response to the load not exceeding a further threshold which is lower than the third threshold, operating in a fifth mode being a DCM, with a second fixed switching frequency. In embodiments, the second fixed switching frequency is equal to the lower switching frequency limit at the further threshold.

In other embodiments, the method further comprises, in response to the load not exceeding a further threshold which is lower than the third threshold, operating in fifth mode, being a BCM with valley skipping, with a second fixed upper frequency limit.

In embodiments, the second fixed upper switching frequency is equal to the upper switching frequency limit at the further threshold.

In yet other embodiments, the method further comprises in response to the load not exceeding a fourth threshold which is lower than the third threshold, operating in a burst mode, with a fixed switching frequency.

In embodiments, the method further comprises, in response to the load not exceeding a fourth threshold which is lower than the third threshold, operating, with a switching frequency which decreases with decreasing load, in a either a DCM or a BCM with valley skipping mode.

According to a further aspect of the invention, there is provided a controller for a switched mode converter and configured to operate a method as summarised above, the controller comprising: a switch; driver for providing a control signal to the switch for switching the switch; a comparator for comparing a signal representative of the current through the switch with a second control signal; a voltage-controlled timer for providing a variable time delay that is dependent upon a third control signal; a timer for determining the switching frequency in the first mode; and a valley detection circuit for enabling switching at a voltage minimum.

The controller is preferably adapted so that the timer is disabled in response to an output of the valley detection circuit.

The second control voltage may be derived from the third control voltage.

The third control voltage is preferably generated by comparing an output voltage of the converter with a reference voltage. The output voltage is preferably the divided output voltage of the switched-mode power supply.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
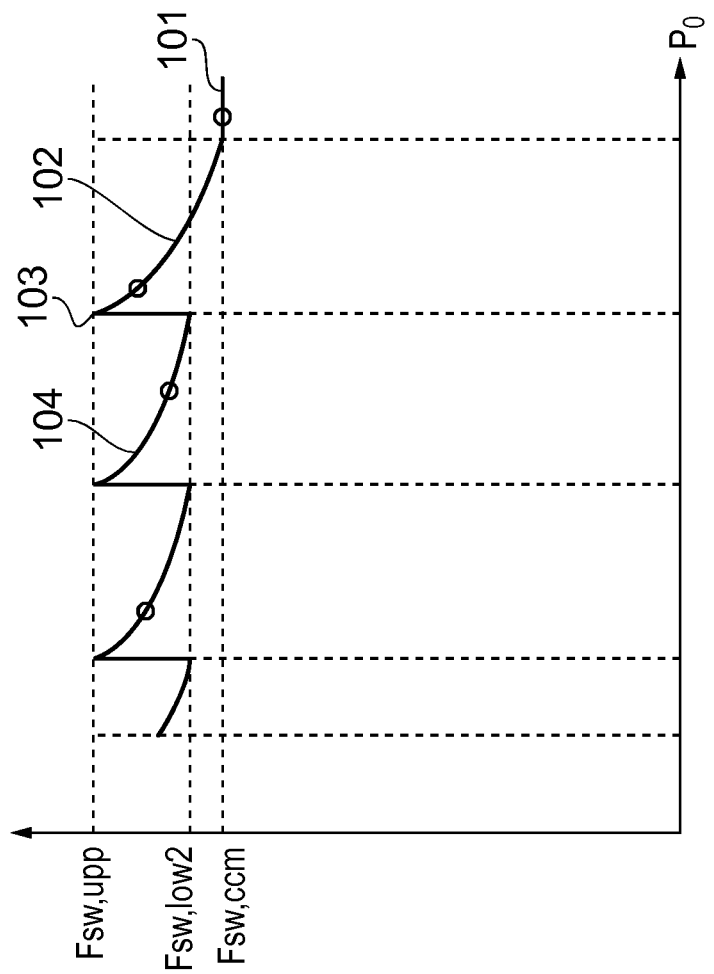
FIG. 1 illustrates a relation between power and frequency according to a known control method.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

FIG. 1 illustrates a relation between power, on the abscissa or x-axis, and frequency, on the ordinate or y-axis, according to a known control method. In this method, at full load shown at 101, CCM switching is applied at a fixed frequency of $f_{sw,CCM}$. As the load is reduced below a threshold, BCM is applied as shown at 102, and the switching frequency is allowed to rise until a maximum frequency $f_{sw,upp}$ is reached at 103, which is set by a timer with a duration programmed to a value $1/f_{sw,upp}$) in the control circuit; at further decreased load, shown at 104, a type of valley skipping takes place (due to the blanking interval), with a further associated minimum switching frequency of $f_{sw,ms}$ As already briefly mentioned, this control is non-ideal. In particular, the control strategy uses the lower frequency limit $f_{sw,CCM}$ for the change from BCM/DCM to CCM operation and thus initiates directly a fixed frequency operation with this lowest switching frequency. Trying to reduce the switching frequency at part load has now two problems. Firstly the reduction to values lower than $f_{sw,CCM}$ (which in one specific implementation is 94.34 kHz) is not possible for the depicted implementation. This means no real benefit from reduction can be obtained. Secondly, as for CCM in general, the initiated fixed frequency operation results in higher than necessary capacitive turn-on losses, since now no longer valley switching would be possible. The third problem is a restriction in the design since the lowest frequency in DCMBCM operation (BCM plus valley skipping) is not allowed to drop below the 94.3 kHz for the given implementation. This imposes for example an upper limit on any external snubber capacitor value. Fourth, the lower frequency limit $f_{sw,CCM}$ (see point 101 in FIG. 1) cannot be adapted to be particularly close to the upper frequency limit $f_{sw,upp}$.

Figure 2:
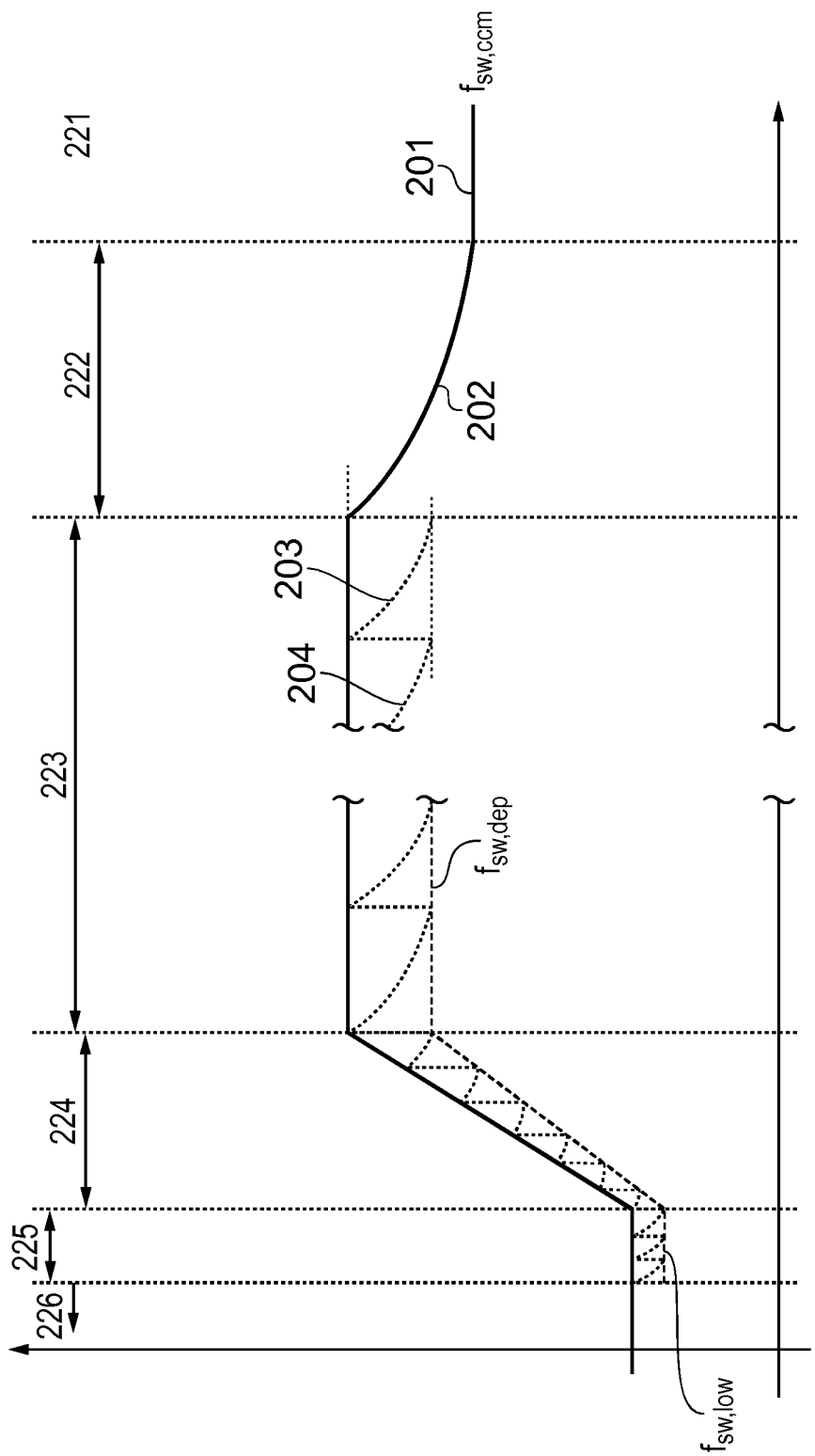
FIG. 2 shows the relation between power and frequency according to embodiments.

FIG. 2 shows the relation between power, on the abscissa or x-axis, and frequency, on the ordinate or y-axis, according to embodiments; at full power the power supply uses CCM, shown at curve 201 in region 221. The capacitive turn-on losses are relatively small compared to the RMS losses which typically dominate at high power.

By allowing use of this mode the number of turns to prevent saturation can be low, since the peak current is limited. Lowering the number of turns may also result in lower losses: the total length of the wire may be shorter; moreover, in the same winding area, thicker wire (or for example litz wire with more strands) can be used, lowering the series resistance even more. And in CCM the RMS value of the current is somewhat smaller. Moreover: the swing of the flux density in the core is low in CCM, which also leads to low losses in the transformer. The RMS current in the magnetic component may also be relatively low, leading to relatively low ohmic losses in the switch, output rectifier and output capacitor.

It will be appreciated, that this is only beneficial in the case that the switching losses are low enough in CCM to not counteract the gain in current related RMS-losses. In other words: this is only really beneficial whenever the load is high (i.e. whenever the current related losses will dominate anyhow) and/or at low input voltage where the switch-on losses will be relatively small due to the low voltage across the switch at switch-on.

This first mode of operation—pure CCM—changes to BCM operation when the load decreases below a first threshold, in such a way, that the transition from one mode to another is smooth. At lower loads the controller operates in a second mode of operation, in particular BCM mode, and preferably in genuine BCM, as shown in region 222. This may occur for example between 80% and 95% of the full power load; however it should be noted that the percentage values of the full power load are mentioned as examples only: other values for the boundaries between regions may be chosen as is appropriate to the specific application and will readily be appreciated by the skilled person. As used herein, genuine BCM mode means that the converter is operated in the first valley of the drain source voltage after the magnetizing current has reached zero, that is to say, genuine BCM includes valley switching, as mentioned above; however it will be appreciated that the invention is not limited thereto. As will be well-known for genuine BCM, as the load is decreased, the switching frequency increases, as shown in curve 202.

Further lowering of the load below a second threshold (for example, between 40% and 80% of the full power) leads to BCMDCM operation the third mode of operation, as shown in region 223. This mode of operation may also be referred to as BCM with valley skipping, as described above. This is due to the introduction of an upper frequency limit $f_{sw,upp}$. This means that the converter is operating under valley switching, however, not the first but any succeeding valley is used. This leads to a slight frequency variation between the upper frequency $f_{sw,upp}$ (shown as a solid line in FIG. 2) and a design-dependent lower switching frequency $f_{sw,dep}$ (shown as a dotted line in FIG. 2) more or less close to the upper frequency. In successive regions 203, 204, etc of the curve, successively more valleys are skipped, as will be known to the skilled person.

According to this control method, beneficially, the value of an external snubber capacitor is no longer restricted, since in BCM due to the valley switching the capacitive turn-on losses are significantly reduced. It will be appreciated that there is a wide design freedom in the choice of the lower frequency limit $f_{sw,CCM}$; in particular, in contrast to the known control method shown in FIG. 1, it can be chosen much closer to the upper frequency limit $f_{sw,upp}$, for example $f_{sw,dep}<f_{sw,ccm}<f_{sw,upp}$, since there is no longer a minimum difference between these frequencies needed.

For even lower output power, below a third threshold (low part load, for example between 20% and 40% of the full power) and shown at region 224, there is a reduction of the upper frequency limit. Although there will be somewhat higher RMS losses a reduction in the switching losses that dominate at lower power levels may be obtained; this reduction may be particularly large. In this embodiment, in this region, corresponding to a fourth mode of operation, the converter still operates in BCM with valley skipping.

In other embodiments, the control operates in DCM, in this load range, rather than in BCM with valley skipping. However the benefit will generally then be less than in case of the BCM with valley skipping.

In embodiments, the frequency reduction is limited to a value $f_{sw,min}$, in order to prevent it entering the audible range. The value of $f_{sw,min}$, may typically, but without limitation, be 20 kHz or approximately 20 kHz.

In case of very low part load (e.g. from 1% to 20% of the full power), shown at region 225 in FIG. 2, again several possible operation modes can be implemented, in different embodiments. In a particularly simple implementation, the frequency is limited to a value of $f_{sw,min}$, which as just described is still above the audible range, and the controller operates at fixed frequency in DCM. However, since the frequency difference caused by skipping one valley more or less becomes negligible in this low switching frequency range it also possible to fix not the switching frequency but the upper frequency limit and still apply valley skipping, in applications where this is possible from the detection point of view; the skilled person will appreciate that in some embodiments, the damped oscillation may prevent reliable determination of the valley minima.

Figure 4:
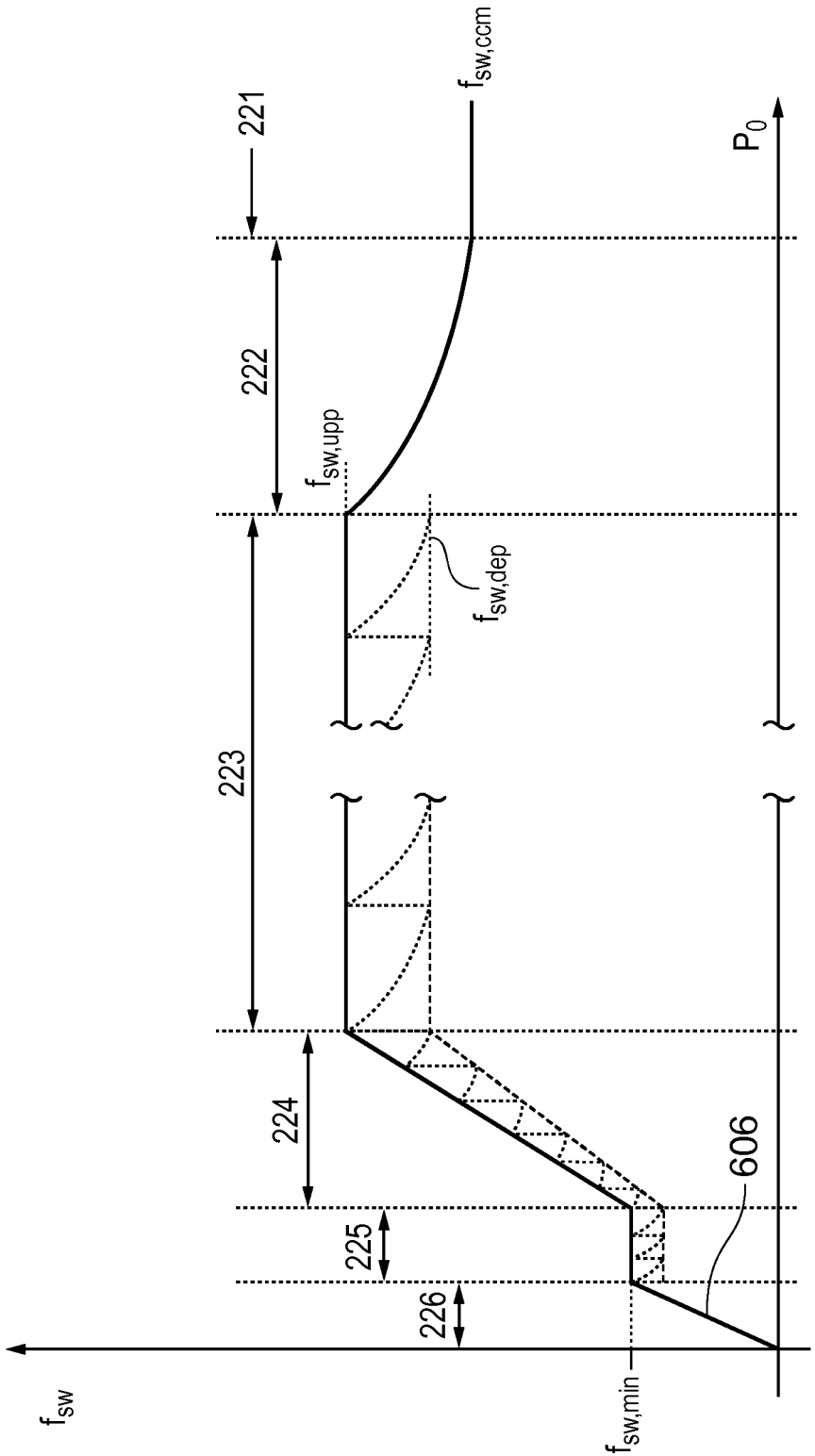
FIG. 4 shows the relation between power and frequency with frequency reduction at extremely low part load.

In case of extremely low partial load and standby operation, shown at region 226, any one of several of solutions which will be well known to the skilled person may be implemented. One well-known solution is burst mode, such as is shown in FIG. 2. Another, non-limiting, option is a further frequency reduction mode down to towards zero, for example as shown in FIG. 4.

Depending on the design the burst mode might even occur before the lowest upper frequency is reached.

In the case of a flyback converter, a suitable choice for the first threshold, that is to say the transition between the first mode of operation which is CCM, and the second mode of operation, which is BCM, may be determined as follows:

At maximum power the current in the primary winding of the transformer starts at a certain level $I_0$ and increases with a certain value $\Delta I$ during Ton, the on-time of the switch. The average current drawn from the input voltage can be determined as:

$Iav=\delta(I_0+\Delta I/2)$, and thus the power as: $Vin*\delta*(I_0+\Delta/2)$ When the power level decreases, the average current decreases as well, and thus also $I_0$ (because $\Delta I$ remains the same, being $Vin*Ton/L$).

At a certain level $I_0$ has dropped to zero, and BCM operation is reached, corresponding to the first threshold and the transition from the first mode to the second mode.

A suitable, but non-limiting, choice for the second threshold, that is to say the transition between the second mode of operation which is BCM, and the third mode of operation which is BCM with valley skipping, may be determined as follows:

Lowering the power level further, BCM operation will be maintained, as Ipeak lowers. This will cause the switching frequency to increase as shown as 202, until an upper switching frequency limit is reached. Reaching this cap corresponds to the second threshold and the transition from the second mode to the third mode.

A suitable, but non-limiting, choice for the third threshold, that is to say the transition between the third mode of operation which is BCM with valley skipping, and the third mode of operation which is BCM with valley skipping but with a load-dependant upper frequency cap, may be determined as follows:

As the load is further reduced in the third region, switching losses become relatively more significant and start to dominate. At some point, corresponding to the third threshold, it becomes justified from an efficiency point of view to reduce the upper switching frequency limit, in order to limit the number of switching events and thus reduce the switching losses. In any particular implementation, this third threshold will be determined by the design and the value of the components chosen. In particular, the threshold may be chosen in light of the balance between the frequency dependant losses and other losses, and may be predetermined or chosen experimentally.

Figure 3:
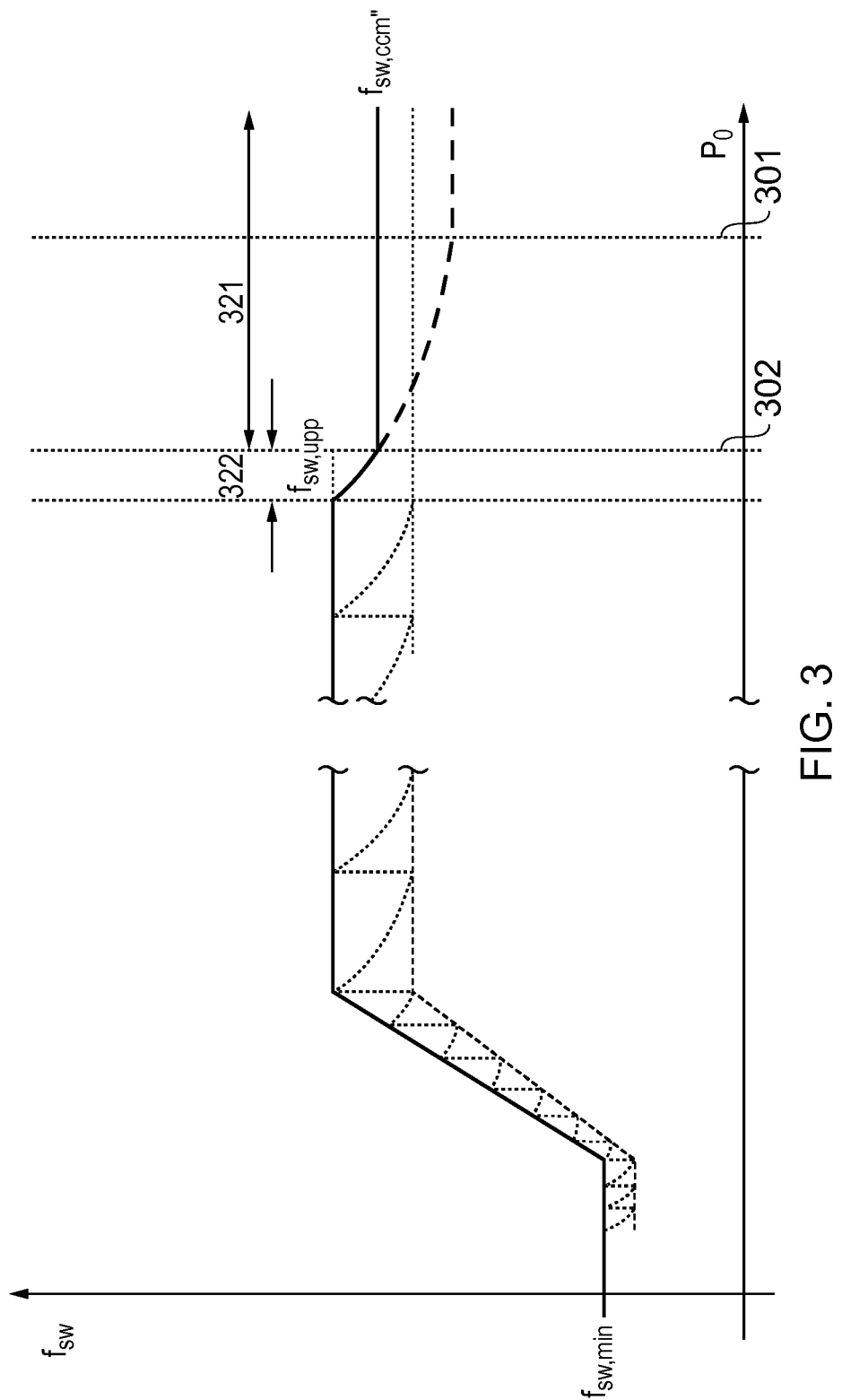
FIG. 3 shows the relation between power and frequency with the lower frequency limit $f_{sw,CCM}$ closer to the upper frequency limit.

FIG. 3 shows the relation between power and frequency, in an embodiment in which the lower frequency limit $f_{sw,CCM}$ is closer to the upper frequency limit, than was the case with the embodiment shown in FIG. 2. The figure is similar to that shown in FIG. 2; however in this case, instead of a relatively low lower frequency limit for high-power operation, shown as $f_{sw,CCM}$ in FIG. 2 and shown as a dashed line in FIG. 3, a higher value is chosen shown as $f_{sw,CCM'}$. As is clear from the figure, the CCM mode of operation in region 321 extends to a lower load 302 than the corresponding CCM mode 221 shown in FIG. 2, which only extends down to a load 301. Conversely, the BCM region 322 corresponding to the second mode operation extends across a smaller part or the range of operating load, such that the second threshold, marking the transition to the third mode being BCM with valley skipping, occurs at the same place. And thus, beneficially, the lower frequency limit marking at the transition from CCM to BCM is not tied to frequency spread (that is to say, the difference between between $f_{sw,upp}$ and the design-dependent lower switching frequency $f_{sw,dep}$) of the BCM with valley skipping third mode operation.

FIG. 4 shows the relation between power and frequency with frequency reduction at extremely low part load. Control in this embodiments is generally similar to that shown in FIG. 2; however, at extremely low loads corresponding to region 226, instead of operating at burst mode, the switching frequency in this embodiment is further reduced towards zero as shown at 606. The skilled person will readily appreciate that this part of the control can either be implemented using pure DCM-operation or BCM with valley-skipping.

Figure 5:
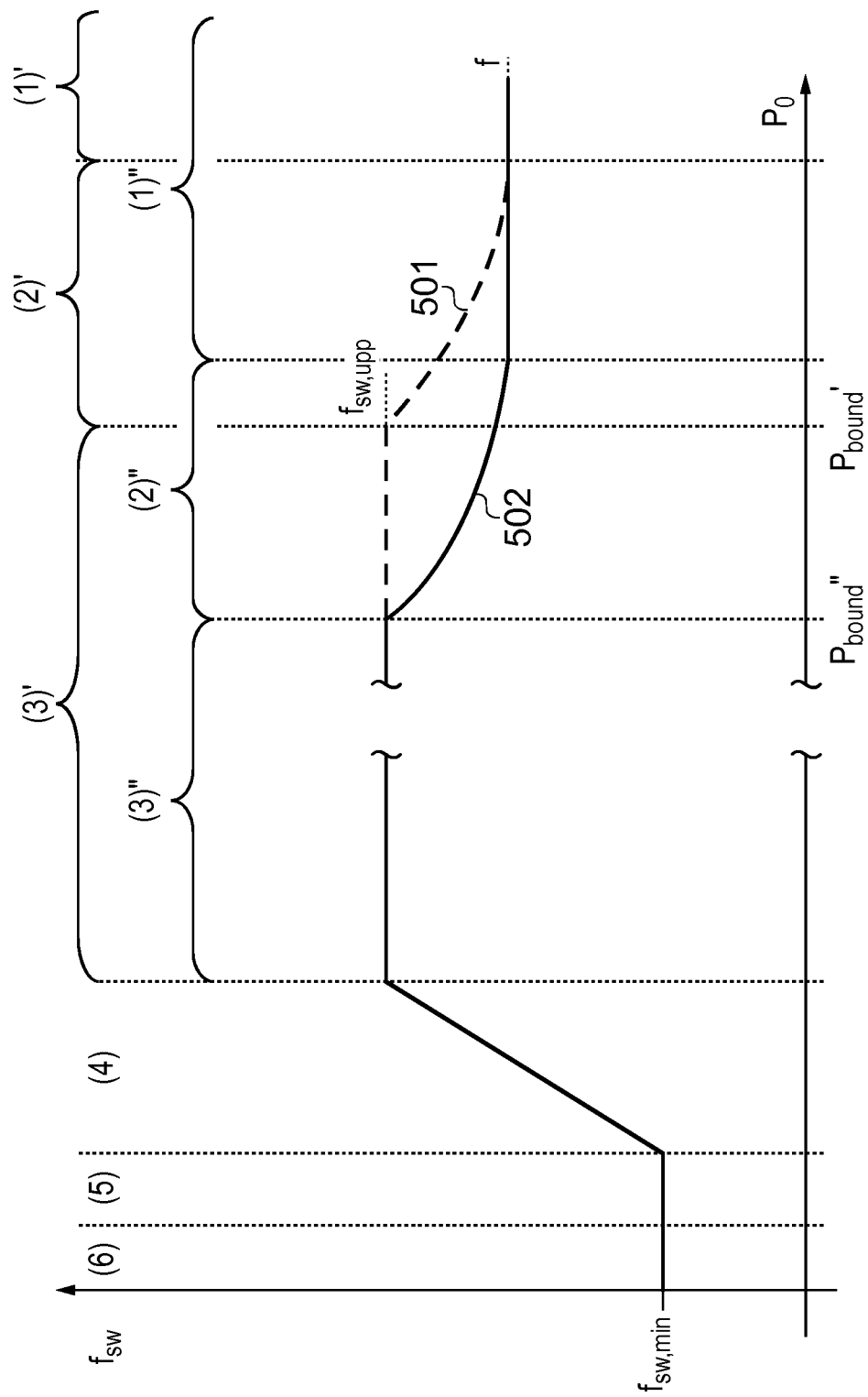
FIG. 5 shows the relation between power and frequency limits in case of two different line input voltages.

FIG. 5 shows the relation between power and frequency limits which result in case that two different input voltages, e.g. two different line voltages, are used; the power-frequency curve for a high input voltage is showing that dotted at 501, and that for a low input voltage is shown solid at 502. Due to variations in input voltage the slopes of the current waveforms will change leading to different switching frequencies at the same power level. In genuine BCM operation at higher input voltage level typically implicates higher switching frequency for the same power level. In other words, in the case of low input voltage, the transition from genuine BCM operation (region 2") to frequency limitations (region 3") typically occurs at a lower power level $P_{bound}$" in comparison to the power level $P_{bound}$' at the transition between the corresponding regions 3' and 2' for the higher input voltage. However, not only is the transition from region 2 to region 3 changed, but also the power level at the transition from CCM (region 1) to genuine BCM operation (region 2) is influenced: that is, the transition from CCM operation (region 1") to genuine BCM (region 2") for lower input voltage occurs at a lower power level in comparison to that at the transition between the corresponding regions 2' and 1' in the case of higher input voltage.

Figure 6:
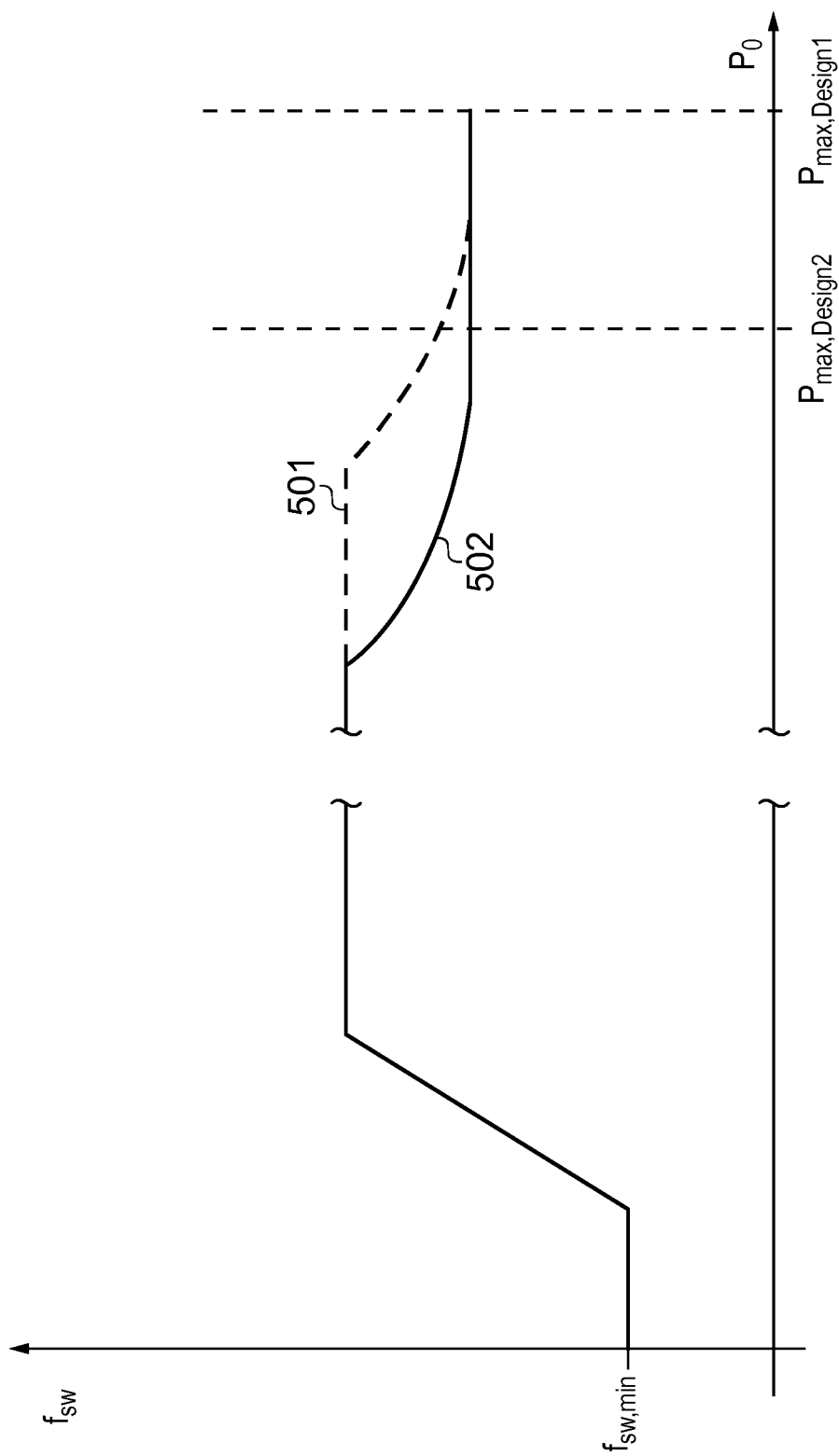
FIG. 6 shows two different design approaches with the proposed solution.

FIG. 6 shows two different design approaches with the proposed solution. Similarly to FIG. 5, the figure shows two different power-frequency curves corresponding to a relatively high input voltage at 501 and a relatively lower input voltage at 502. Due to the influence of the input voltage on the power levels at the transition from region 1 to 2 and region 2 to 3, discussed in relation to FIG. 5, the designer has an additional degree of freedom: it is on the one hand possible, to design the SMPS such that the converter is operated at full power $P_{max,Design1}$ in CCM for low and high input voltages. However, for some applications it may be advantageous because of the occurring switching losses to avoid CCM operation as far as possible. Thus, CCM operation should only be applied at the lowest input voltages (with the highest occurring currents) to avoid saturation of the inductor. Thus, the second approach is to design the SMPS such that only in case of the low input voltage and maximum power level $P_{max,Design2}$, the converter is working in CCM. In case of the maximum power level and $P_{max,Design2}$ the converter is then, for the high input voltage, automatically in a more beneficial BCM operation.

Figure 7:
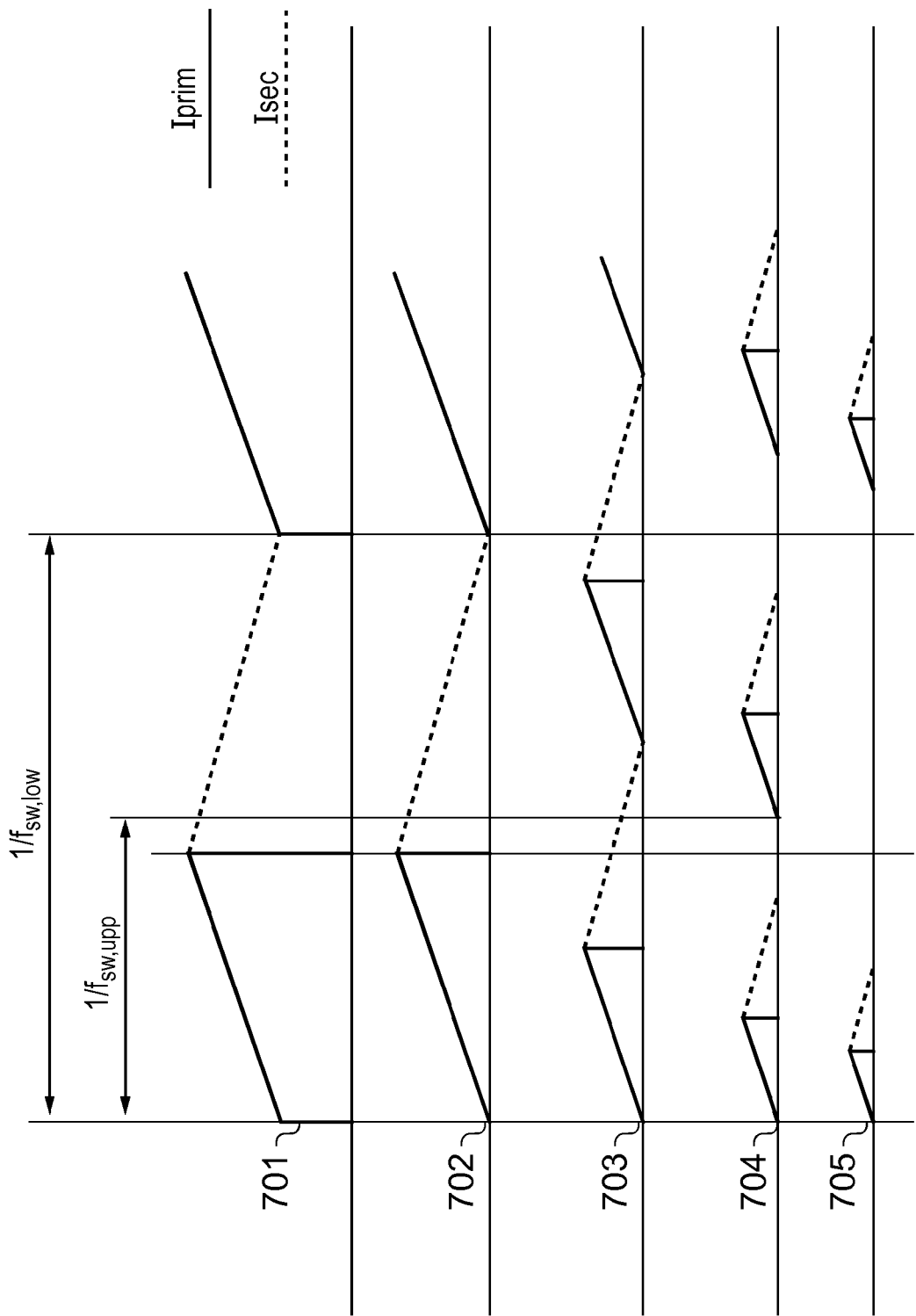
FIG. 7 shows the associated primary and secondary side current waveforms.

FIG. 7 shows the associated primary side (solid) and secondary side (dotted) current waveforms for modes discussed above in relation to FIG. 4, for the case of a flyback converter; at 701 are shown the primary and secondary waveforms for CCM mode operation (corresponding to a high power or high load operation, in region 221); at 702 are shown the waveforms at the CCMBCM border; at 703 are shown the waveforms for the genuine BCM operation (region 222), and at 704 are shown the waveforms for BCM with valley-skipping (region 223), with the upper switching frequency limit $f_{sw,upp}$. Finally, at 705 are shown the waveforms during the frequency reduction mode (region 224).

It should be pointed out that, for purposes of clarity, in FIG. 7, for none of the waveforms valley switching or valley skipping is depicted. Except in CCM operation, valley switching can generally be implemented, as will be appreciated but skilled person.

Figure 8:
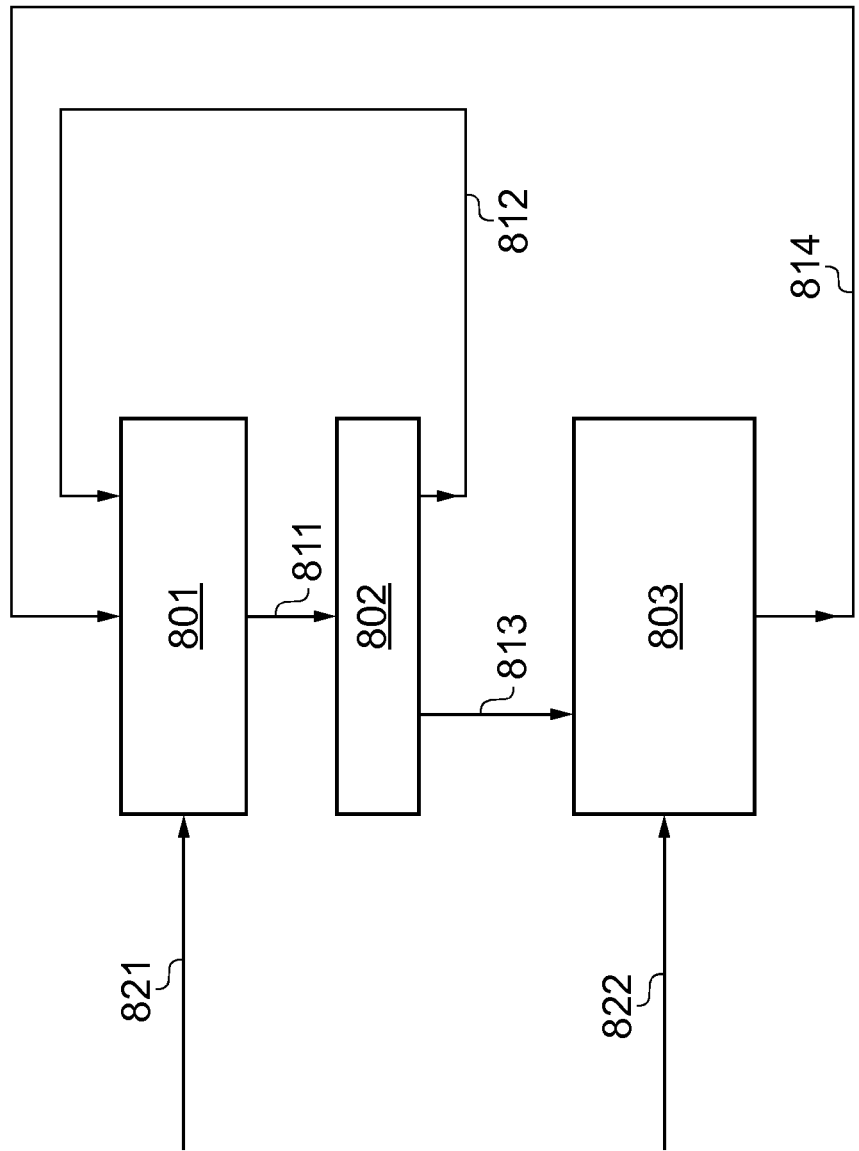
FIG. 8 shows a simplified state diagram of the control algorithm, according to embodiments.

FIG. 8 shows a simplified state diagram of the control algorithm according to embodiments. It should be mentioned at the outset that, operation at the lowest power levels, such as 225 and 226, are not shown, for simplicity, and such operation will be well known to the skilled person.

The flow diagram has three states or boxes:
on entering state 801, the control FET is switched on and a Tmax timer is started; on entering state 802 the control of FET is switched off; on entering a state 803, the Tmax timer is disabled and a BCM controller is activated.

Change of state between the states occurs as follows:
811 shows the change of state between 801 and 802, and corresponds to an elapsed Ton (the on-time of the switch) or reached IPeak (the peak current of the switch); 812 shows the change of state between 802 and 801, and corresponds to an elapsed Tmax (Tmax corresponds to $1/f_{sw,CCM}$); 813 shows the change of state between 802 and 803, and corresponds to a valley detection. 814 shows the change of state 803 and 801, and corresponds to the output of the BCM controller.

Control information is provided to the state boxes as follows:
821 represents control information regarding Ton and/or IPeak; 822 represent control information regarding P0, fmax (P0) and burst.

Operation of the control algorithm will now be described in more detail in case of a flyback-converter:

The starting point is the instant that the primary switch is switched-on, on entering state 801. In this discussion, the primary switch will be assumed to be a FET, although the skilled person will appreciate that invention is not limited thereto. At the same time a timer Tmax is started, that determines the maximum cycle time associated with the CCM operation.

After a while, the on-time of the switch elapses. Without limitation, this may be controlled by means of an voltage mode PWM controller, a voltage-controlled timer or a peak current controller (for current mode control). After the required on-time of the switch the control moves to state 802, the switch is switched off, and the current starts to flow to the secondary side.

Now two possibilities exist.

First possibility: the secondary current has not dropped to zero at the time determined by the Tmax timer (region 221 in FIG. 2). In that case the switch is switched-on again via 812, and the cycle repeats. In other words, for this possibility no valley has been detected before the Tmax time has elapsed. The secondary current may have been dropped to zero just before, but the time between the real end of the secondary stroke and the end of Tmax is less than half the ringing time of the primary inductance with the capacitance at the switching node, such that the valley for valley switching is not reached. (Typically the switching node will be the drain of the FET, although it will be appreciated of that this is not significant, as regards the operation of the algorithm).

Second possibility: The secondary current has dropped to zero and at least one valley may have been detected. In that case we have either the situation that the genuine BCM mode is effective (region 222 of FIG. 2), or the BCM region with the upper fixed frequency (region 223) or any other region for lower power levels is effective. In the latter case the switching frequency can be lower or higher than the frequency determined by the Tmax timer. In order to prevent the Tmax timer from switching prematurely on the FET (overruling any frequency reduction operation of region 224) the Tmax timer must be disabled (which is effective on entering state 803). When this is done, the controller may perform using the same way of operation that is already known for instance (e.g. in many controllers that belonging to the GreenChip II family of devices supplied by NXP Semiconductors®), including frequency clamping with or without valley skipping, frequency reduction with either Ipeak,max or reduced Ipeak, or a combination, and burst mode etc. (This corresponds to regions 223 to 226 in FIG. 2). The switch is switched-on again via 814, and the cycle repeats.

Figure 9:
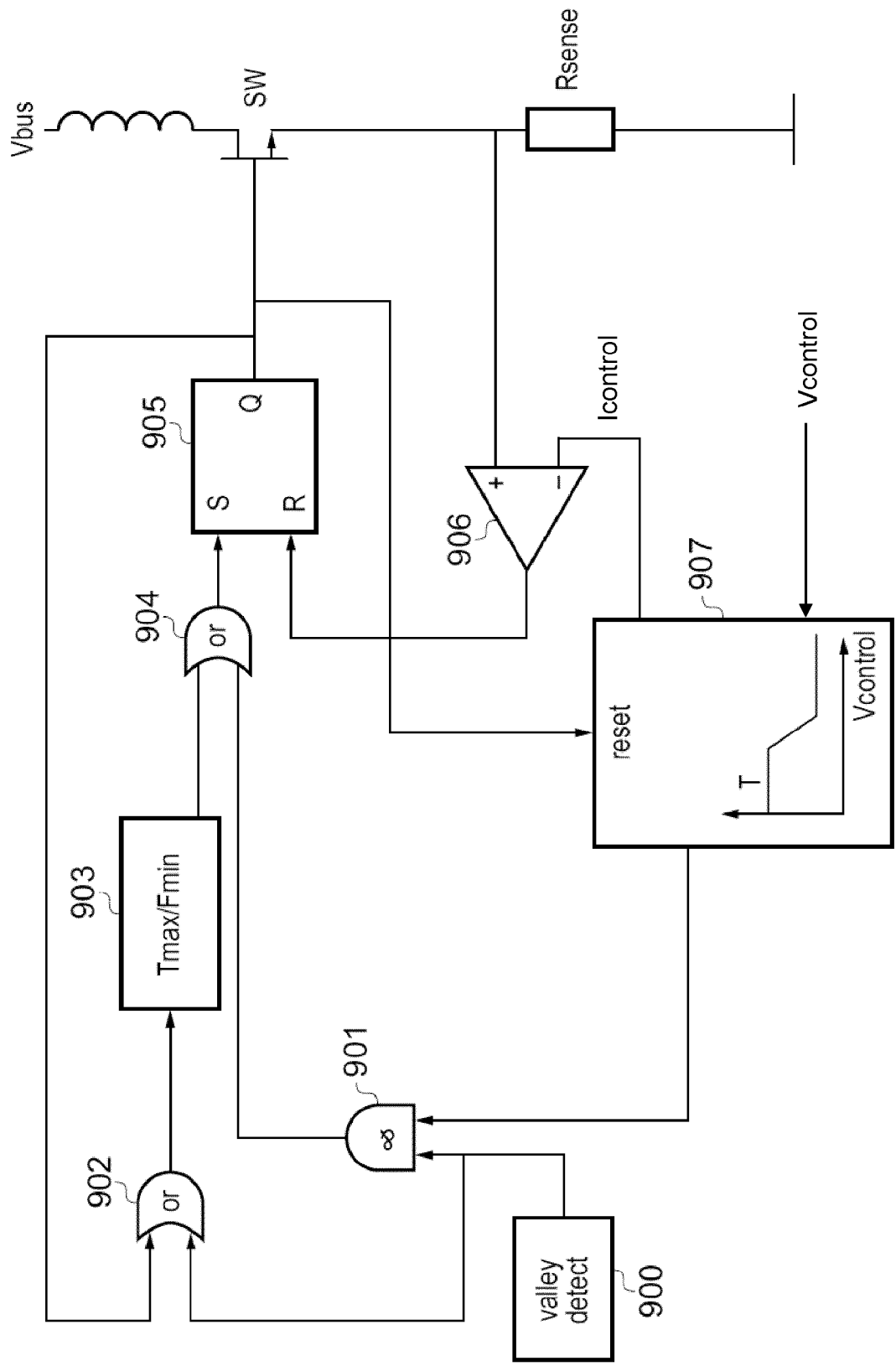
FIG. 9 shows a schematic of an embodiment of one aspect.

FIG. 9 shows a schematic of an embodiment according to one aspect; the figure assumes current mode control, although it will be appreciated that the invention is not so limited. The convertor includes a switch SW, in series with an inductor such as the primary side of a flyback transformer and a sense resistor Rsense. The inductor is e.g. the primary winding of a transformer; for reasons of clarity, the secondary side of the transformer, and other circuitry associated with the output of the converter, such as is well known to the skilled person, is omitted from this figure. The SW is controlled by a control signal from a set-reset flip-flop 905. As shown, the flip-flop 905 drives the gate of the switch implemented as a FET. The ramp for the input of comparator 906 that determines the instant of switch-off of switch SW is the voltage across the sensing resistor Rsense. The instant of switch-off is determined by the voltage signal Icontrol that is generated by the timer & current control block 907.

The figure shows further a valley detection circuit 900 that detects valleys in the voltage across switch SW, a voltage controlled timer 907 which also generates the reference voltage for comparator 906, a Tmax timer 903, and some logic circuitry consisting of an AND gate 901, OR-gates 902 and 904.

The lower the power level, the lower is the control voltage Vcontrol. This control voltage is derived by comparing the (divided) output voltage of the SMPS with a reference voltage, thus indicating a deviation from a set point value. This circuit is not further depicted here as it is well known in the art. At high power, the current level for switch off is high. After driver flip-flop 905 has turned the switch on, the current increases to the level that corresponds to Icontrol. This turns the output of comparator 906 high, and the driver 905 is reset, turning the switch SW off. After the switch is turned off, the current flows to the output (not shown). During the rising edge of the flip-flop's Q (corresponding to turn-on of the switch), the timer 907 is reset, turning its output low. The time that the output of 907 remains low is determined by the transfer curve of the (non-linear) VCT 907. The relation between time constant and Vcontrol has a single step-down, characteristic, as is qualitatively shown by the sketch inside 907. Suitable VCTs 907 that generate both a timer and a current-control signal are known in the art, for example from the GreenChip II and III controllers manufactured by NXP Semiconductors (TEA150x, 153x, 175x).

The set pulse for 905 comes from either the output of gate 901, or the output of the Tmax timer 903, whichever comes first.

The reset of timer 903, in turn, is given by either the output of flip-flop 905, or from the valley detect circuit, whichever comes first. Output of 901 can only be logically high when simultaneously two conditions are fulfilled: a valley must be detected, and the output of 907 must be high.

Figure 10:
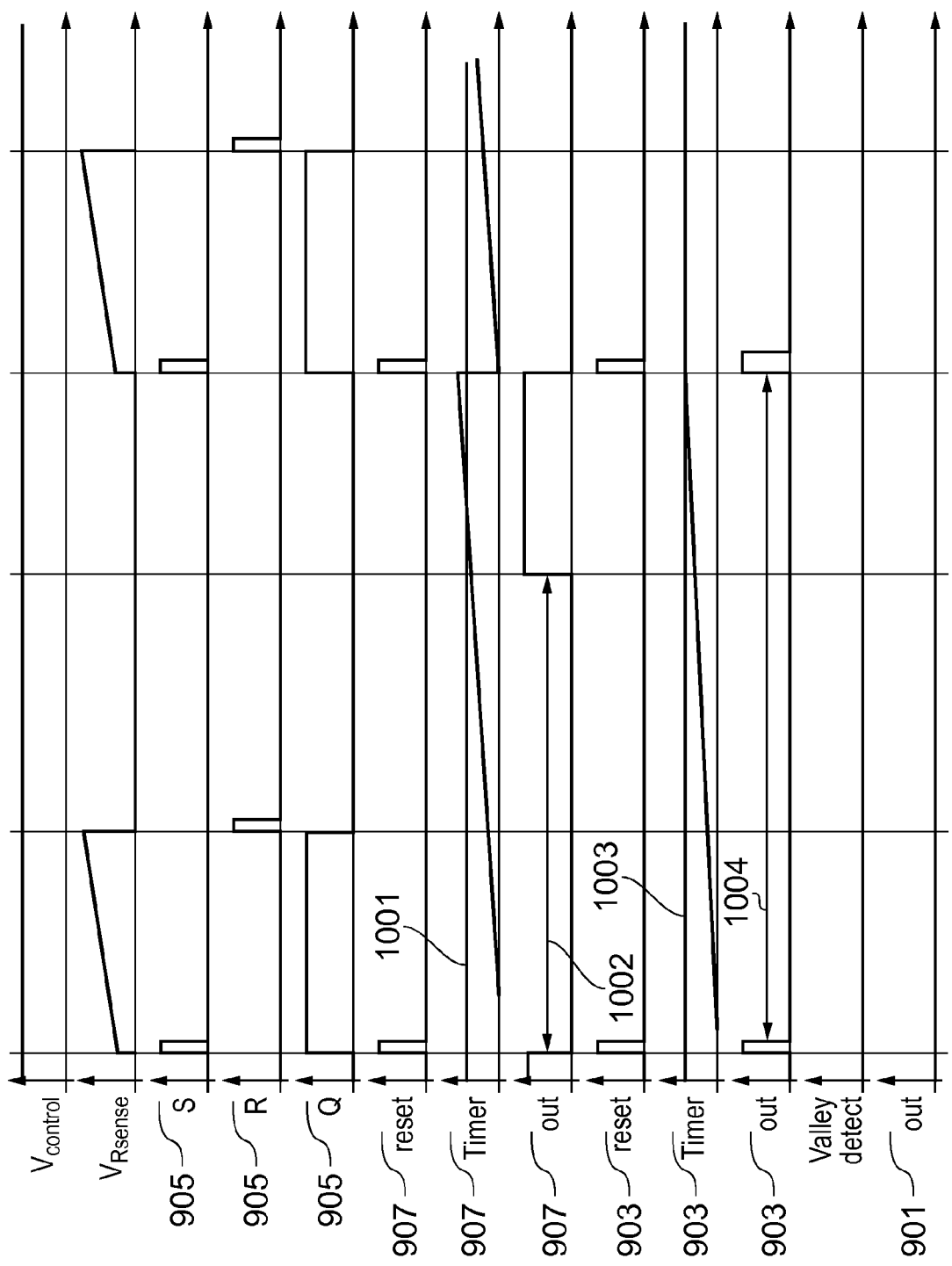
FIG. 10 shows a timing diagram in case of CCM operation.
Figure 11:
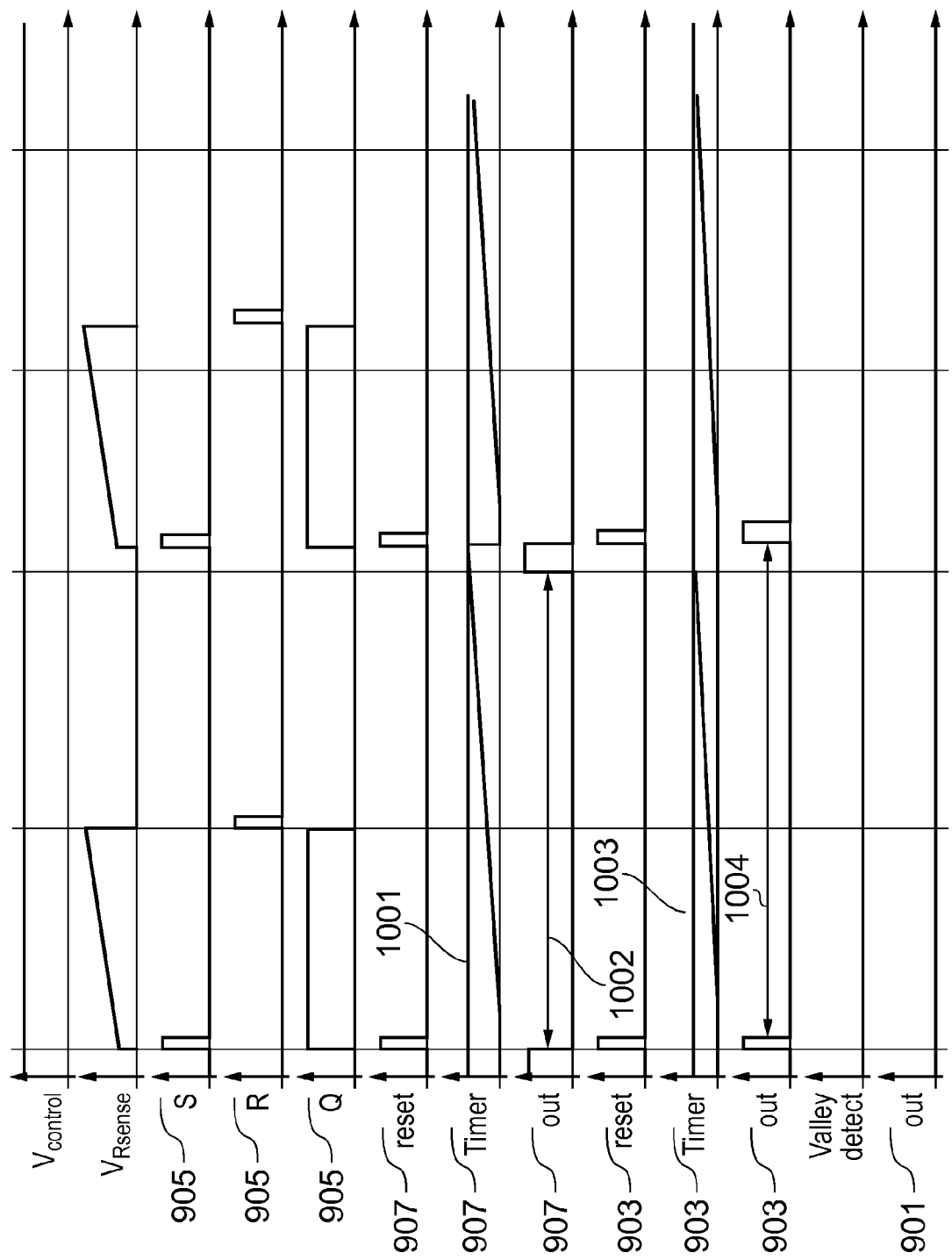
FIG. 11 shows a timing diagram in case of CCM operation with $f_{sw,low}$ close to $f_{sw,upp}$.
Figure 12:
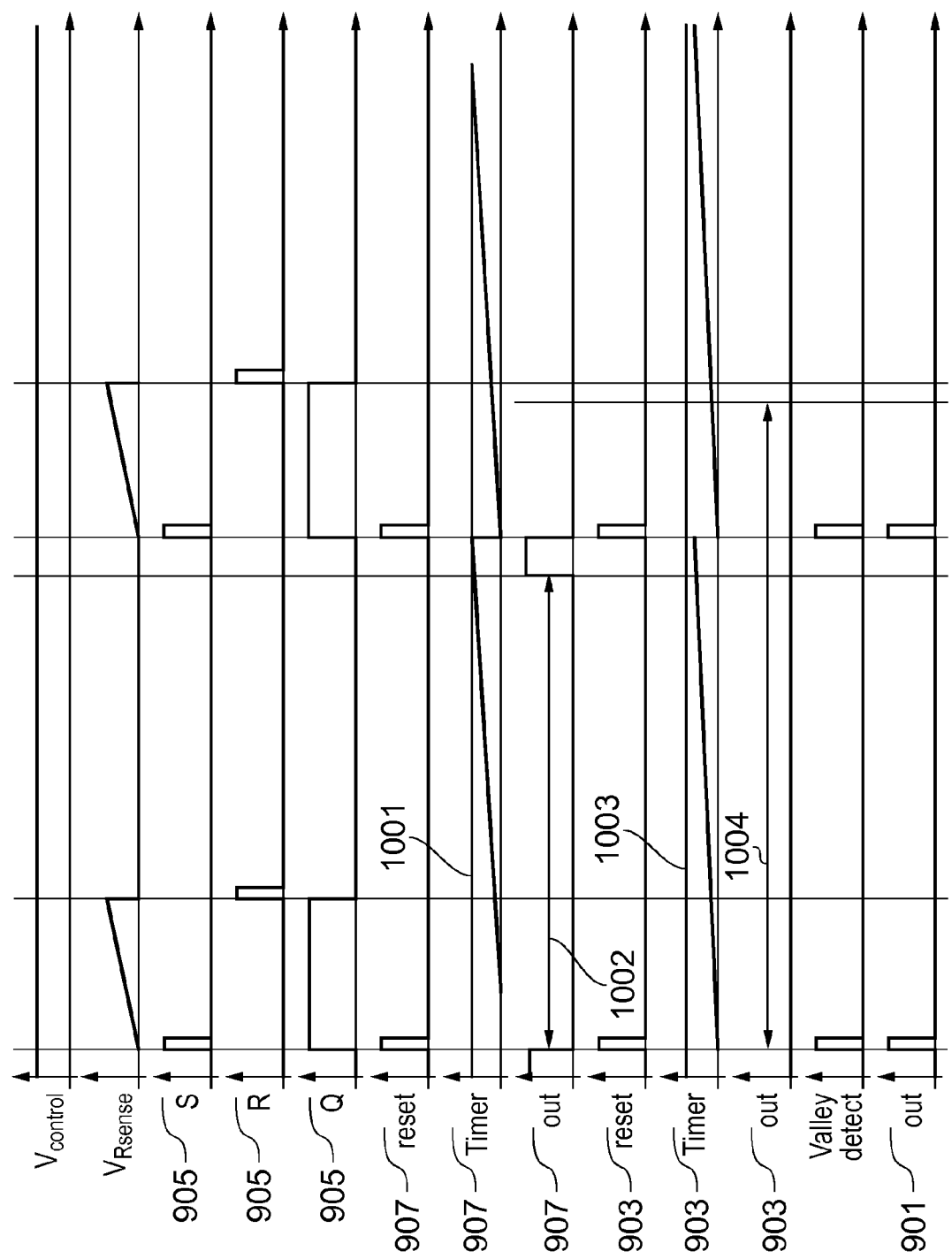
FIG. 12 shows a timing diagram in case of genuine BCM operation.
Figure 13:
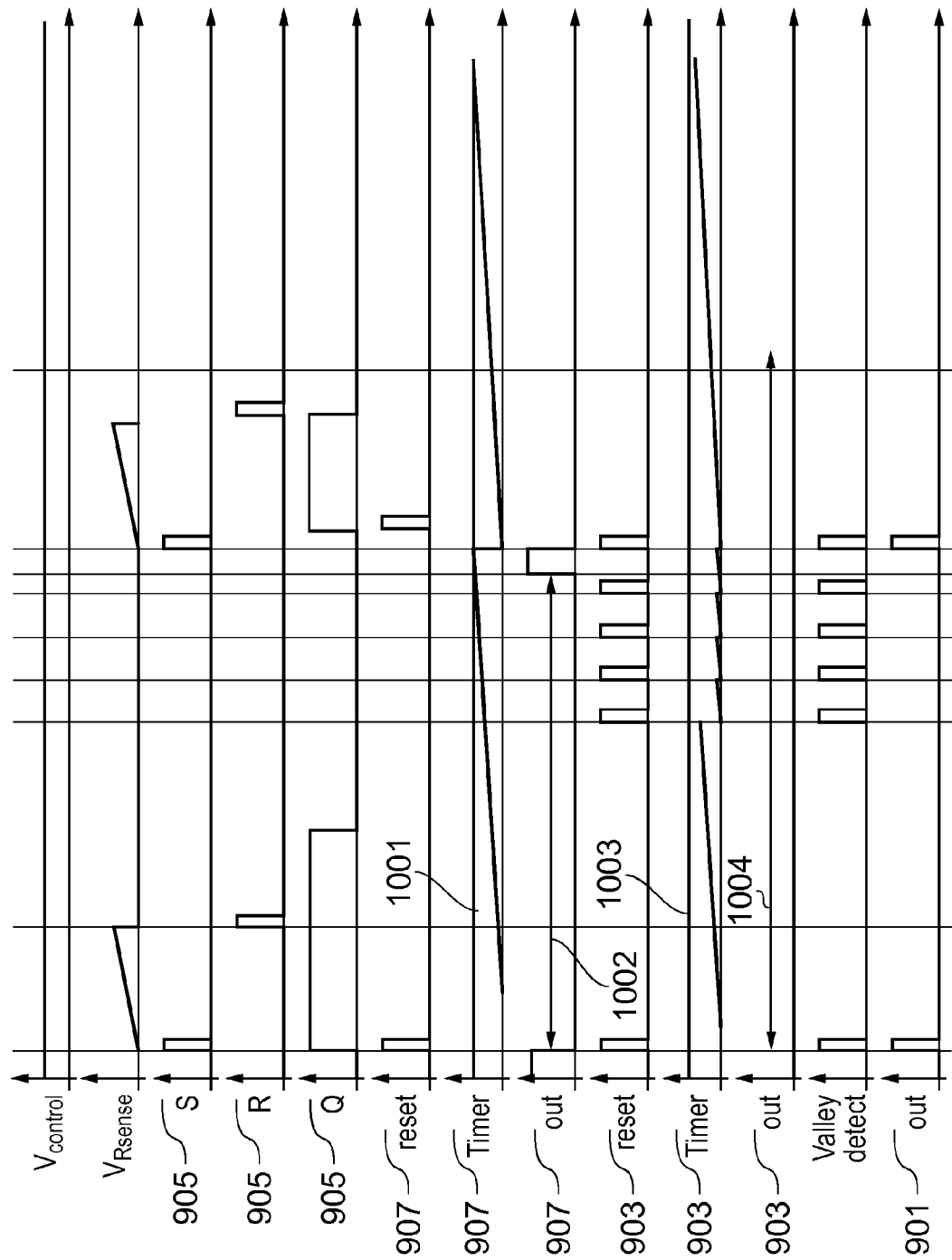
FIG. 13 shows a timing diagram in case of a upper frequency limit.
Figure 14:
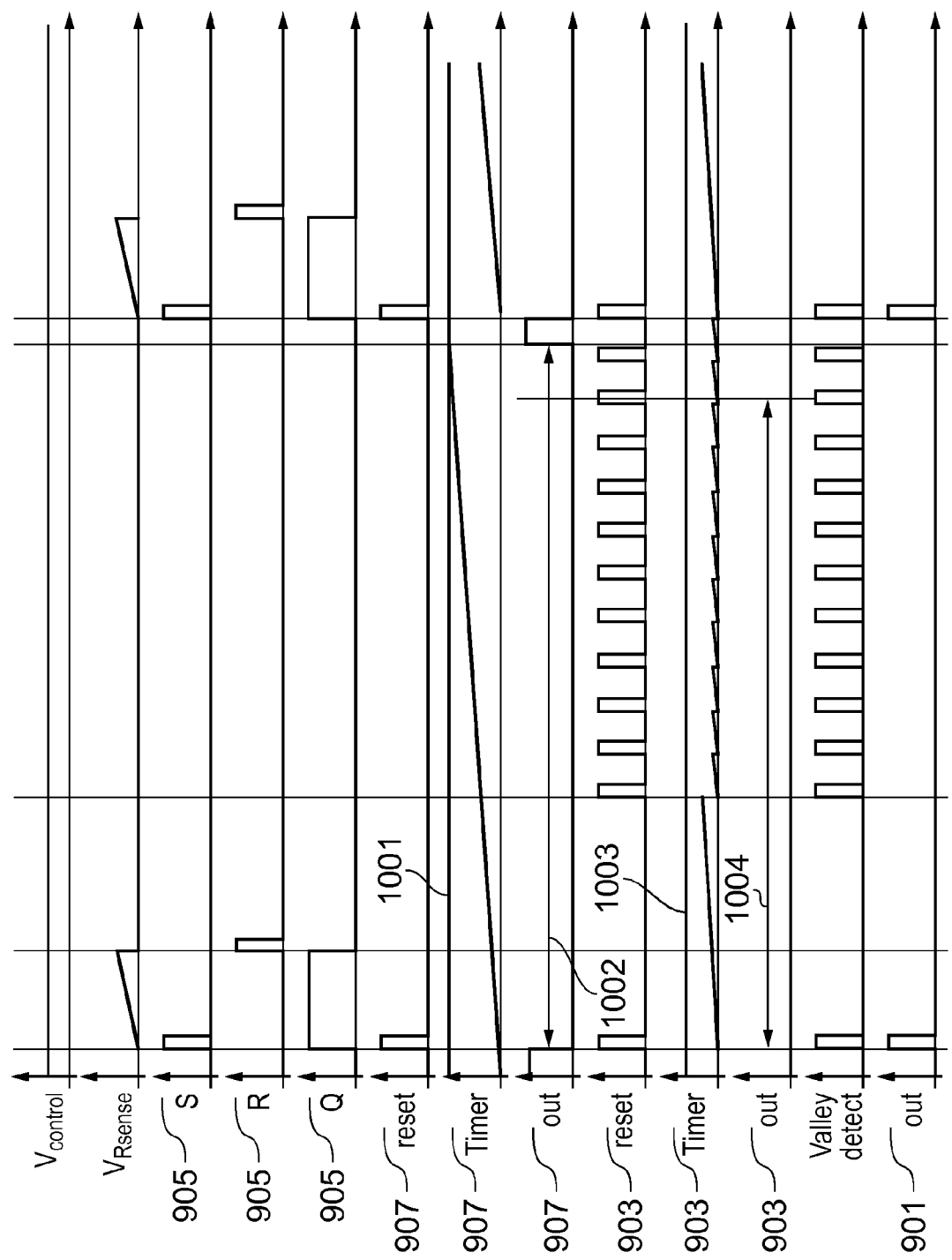
FIG. 14 shows a timing diagram in case of a load dependant and decreasing upper frequency limit.
Figure 15A:
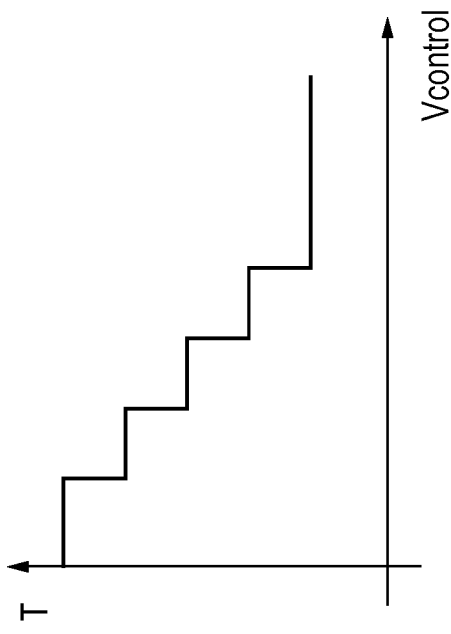
FIG. 15 shows other, non-limiting characteristics, of a voltage controlled timer.
Figure 15B:
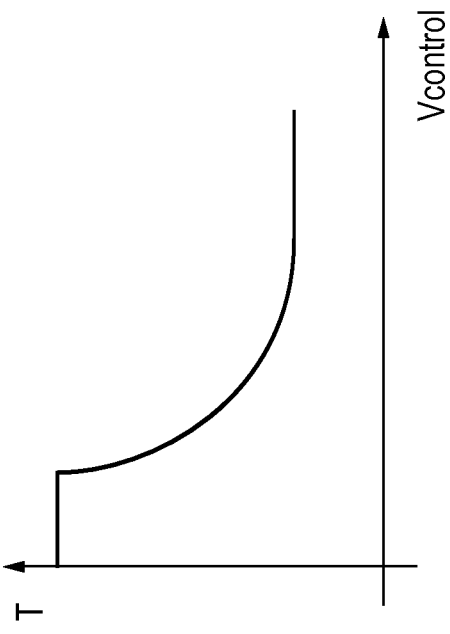
Figure 15C:
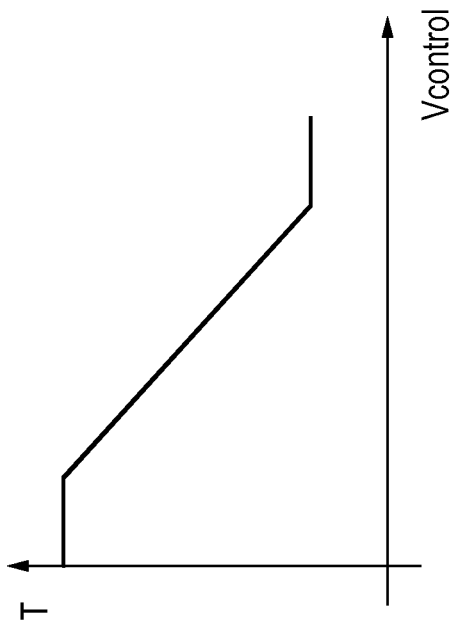
Figure 15D:
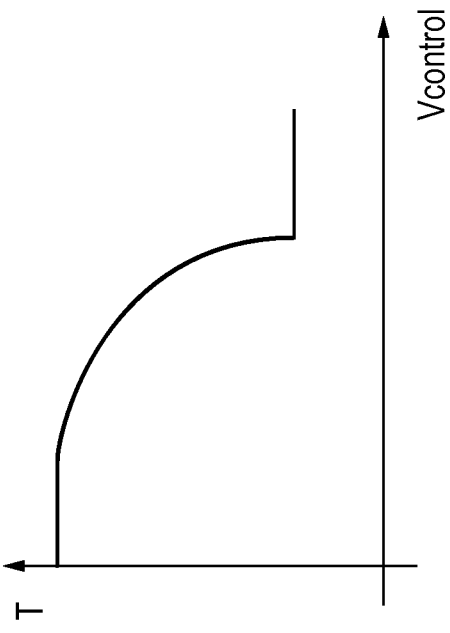

FIGS. 10 to 14 show timing diagrams in various modes of operation: FIG. 10 shows a timing diagram in case of CCM operation; FIG. 11 shows a timing diagram in case of CCM operation with $f_{sw,low}$ close to $f_{sw,upp}$; FIG. 12 shows a timing diagram in case of genuine BCM operation; FIG. 13 shows a timing diagram in case of an upper frequency limit; finally, FIG. 14 shows a timing diagram in case of a BCM with valley skipping and frequency reduction (as shown in region 224 of FIG. 2).

Each figure shows (from the top curve), relative to FIG. 9, Vcontrol, the voltage $V_{Rsense}$ across Rsense, the set, reset, and Q of flip-flop 905, the reset, timer, and output of VCT 907, the reset, timer and output from Tmax timer 903, the output 'Valley detect' from the Valley detection circuit 900, and the output from "and" logic 901 (which combines the output from the VCT 907 and valley detector 900).

In each case the various trigger levels, or time-out periods are shown: 1001 is the variable end-point defined by the VCT, according to the additional control information; 1002 is the value of Tmin defined by the VCT; 1003 is the value of the trigger level to reset timer 903, and 1004 is the time-limit Tmax.

At high load and low input voltage it is for example desired to work in CCM (region 221 in FIG. 2). The timing diagram of FIG. 10 illustrates this behaviour. The current through the inductive component will not drop to zero before the timer 903 has elapsed. In that case the output of 903 turns high irrespective of the current though the inductor, and SW is turned on. The output of VCT 907 has become logically high already before the output of 903 becomes high, but that has no effect, since no valleys are detected and the output of 901 remains thus low. Also 903 is only reset by the timer itself via the positive edge of the output of 905 and the or-gate 902. The valley detect circuit 900 has no influence for this operation mode.

A similar situation is illustrated in the timing diagram of FIG. 11. The converter is also working in CCM, so no valleys are detected and the timer 903 determines the activation of the switch. However, in contrast to the timing diagram of FIG. 10, the time Tmax set by the timer 903 is much shorter so that the switching frequency is much higher. It can be seen, that there is only a small difference between Tmin representing $1f_{sw,upp}$, and Tmax, representing $1f_{sw}$,CCM. Thus this timing diagram corresponds to the implementation of FIG. 3 and proves, that it is possible to choose $f_{sw,CCM}$ close to $f_{sw,upp}$.

When Vcontrol lowers with decreasing power level (see timing diagram of FIG. 12), the ontime of switch SW becomes lower, and the total cycle time ending in no current through the inductive component, will enable the valley detector to become effective. As long as the timer output of 907 is high before the valley is detected, the output of 901 will become high at the first instant that a valley is detected. This will result in a genuine BCM operation. Timer 903 is not effective anymore, because now the circuit 900 retriggers or resets 903 before Tmax is elapsed. The output of 903 remains always low.

In case of medium power levels (with Vcontrol even lower, see timing diagram of FIG. 13), eventually more than one valley occurs before the timer 907 is elapsed and the output of 907 becomes high. In case that Tmin is elapsed and the output of 907 is high, the first following valley will set 905 via the and-gate 901. The frequency will now be more or less fixed, resulting in a maximum frequency, given by 907 (compare region 223). That results in the timer 907 to determine the frequency in combination with the next valley detected. This results in a valley-skipping action, meaning that no longer the first but a corresponding later valley is used. Timer 903 is also not effective, because now the circuit 900 retriggers 903 every time a valley is detected. Thus Tmax will never elapse and the output of 903 remains low.

When Vcontrol drops even further (see FIG. 14), the time during which the output of 907 is kept low after a reset, increases. That is, the function implemented in 907 is responsible to prolong Tmin and results in the frequency reduction mode. The frequency will again be more or less fixed, resulting in a maximum frequency, given by 907. However, the frequency is now, as desired, reduced (compare region 224 of FIG. 2). By maximizing Tmin a minimum frequency can be set, e.g. 25 kHz. The output of 901 will become high at the first valley detect output after the output of 907 has become high.

Although in FIG. 9 the characteristic of the voltage controlled timer VCT 907 was shown as single stepwise decreasing, the skilled person will appreciate that it may take many other, generally decreasing, form. Examples are shown in FIG. 15, including a more generally sloped single step form at FIG. 15(*a*), a multistep decreasing staircase at 15(*b*), a convex curve (with increasing gradient) at FIG. 15(*c*), or a concave verve (with decreasing gradient) at FIG. 15(*d*). Further, it will be appreciated by the skilled person that the VCT may be implemented either by analogue circuitry or by digital circuitry, as appropriate for the specific application or embodiment From reading the present disclosure, other variations and modifications will be apparent to the skilled person. Such variations and modifications may involve equivalent and other features which are already known in the art of controlling DC-DC converter, and which may be used instead of, or in addition to, features already described herein. For instance, a burst mode may be implemented at very low-power, using additional circuit which detects the appropriate level of Vcontrol indicative of very low load, and which could temporarily overrule the operation of the circuit shown in FIG. 9.

Further, the skilled person would appreciate that, although the examples above have been described generally in terms of flyback topology, embodiments are applicable to other DC to DC converter topologies which are hard switched: these include without limitation boost, buck, buck-boost, Sepic, Cuk, Zeta, Push-Pull, Forward, Flyback, Half bridge, and Fullbridge. Further, since in embodiments there is no requirement for a constant DC input voltage, the skilled person would appreciate that the invention may further apply to PFC (power factor control) stages.

As a non-limiting example of another topology encompassed by embodiments of the invention, consider the case of a boost converter:

In the first operation mode, the boost is operated in CCM. In such an embodiment, the inductor current increases from a non-zero and positive minimum level to a maximum level during a primary stroke, then it decreases back to the minimum level during the secondary stroke. It will be appreciated that because of switching on at Vout, high capacitive turn-on losses are associated with CCM operation; nonetheless, this mode of operation may be beneficial with respect to RMS losses and with respect to the design of the inductor.

In the second mode of operation the converter is driven in BCM operation with valley-switching. The inductor current increases from zero, or nearly zero, to a maximum level during a primary stroke, then it decreases back to zero during the secondary stroke. After the inductor current has reached zero, an oscillation of the inductor current and the switch voltage occurs. If the switch is switched on at the first minimum of the ringing, thus at the first valley, the capacitive losses can be reduced drastically.

In the third mode of operation, BCM with valley-skipping is applied, wherein the switching frequency depends on the load and the number of valleys skipped and is between a fixed upper and a lower switching frequency limit. It will be appreciated that BCM mode (with or without valley skipping) has the advantages of low switching losses, and a low value of the inductance enabling a relatively low number of turns, with consequentially reduced series resistance.

During a fourth mode, the boost converter is working in BCM with valley-skipping, wherein the switching frequency depends on at least the load, and is between an upper and a lower switching frequency limit at least one of which limits decreases with decreasing load.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of controlling a switched mode converter comprising a switch and for providing power to device having a load, comprising:
  in response to the load exceeding a first threshold, operating in a first mode, being a continuous conduction mode (CCM);
  in response to the load exceeding a second threshold and not exceeding the first threshold, operating in second mode, being a boundary conduction mode (BCM) without valley skipping wherein the switching frequency increases with decreasing load;
  in response to the load exceeding a third threshold and not exceeding the second threshold, operating in a third mode, being a BCM with valley skipping, wherein the switching frequency depends on the load and the number of valleys skipped and is between a fixed upper and a lower switching frequency limit; and
  in response to the load not exceeding the third threshold, operating in a fourth mode, being a BCM with valley skipping, wherein the switching frequency depends on at least the load, and is between an upper and a lower switching frequency limit wherein the upper switching frequency limit decreases with decreasing load.

2. The method of claim 1, wherein the switching frequency in the first mode is determined by a timer, the method further comprising the steps of:
  detecting a valley in the voltage across the switch; and
  in response, disabling the timer.

3. The method of claim 1, wherein, in the fourth mode, the upper switching frequency limit is reduced dependent upon a control voltage of the converter.

4. The method of claim 1, wherein the first threshold is the load at which the root mean square (RMS) losses in the switch are equal to the switching losses.

5. The method of claim 1, wherein
  the second threshold is the load at which the switching frequency is equal to a predetermined maximum upper switching frequency.

6. The method of claim 1, further comprising, in response to the load not exceeding a further threshold which is lower than the third threshold, operating in a fifth mode being a discontinuous conduction mode (DCM), with a second fixed switching frequency.

7. The method of claim 6 wherein the second fixed switching frequency is equal to the lower switching frequency limit at the further threshold.

8. The method of claim 1, further comprising, in response to the load not exceeding a further threshold which is lower than the third threshold, operating in fifth mode, being a BCM with valley skipping, with a second fixed upper frequency limit.

9. The method of claim 8 wherein the second fixed upper switching frequency is equal to the upper switching frequency limit at the further threshold.

10. The method of claim 1, further comprising, in response to the load not exceeding a fourth threshold which is lower than the third threshold, operating in a burst mode, with a fixed switching frequency.

11. The method of claim 1, further comprising, in response to the load not exceeding a fourth threshold which is lower than the third threshold, operating, with a switching frequency which decreases with decreasing load, in a either a DCM or a BCM with valley skipping mode.

12. A controller for a switched mode converter and configured to operate the method of claim 1, the controller comprising:
a switch;
a driver for providing a control signal to the switch for switching the switch;
a comparator for comparing a signal representative of the current through the switch with a second control signal;
a voltage-controlled timer for providing a variable time delay that is dependent upon a third control signal;
a timer for determining the switching frequency in the first mode;
and a valley detection circuit for enabling switching at a voltage minimum.

13. The controller of claim 12, adapted such that the timer is disabled in response to an output of the valley detection circuit.

14. The circuit of claim 12, wherein the second control voltage is derived from the third control voltage.

15. The circuit of claim 12,
wherein the third control voltage is generated by comparing an output voltage of the converter with a reference voltage.

* * * * *